United States Patent [19]
Lavrinovich et al.

[11] 3,821,231
[45] June 28, 1974

[54] METHOD FOR PREPARATION OF N-SUBSTITUTED 4-ANILINE PIPERIDINES

[76] Inventors: Edvard Stanislavovich Lavrinovich, ulitsa Bolshaya Besher 5/9, kv. 14; Skaidrite Karlovna Germane, ulitsa Zalya, 3, kv. 16a, Riga; Ilze Edgarovna Treigute, Ulitsa Lenina, 29, Kv. 1, Olaine; Matisovich Gunar Edzhin, ulitsa Rupnietsibas, 16, kv. 18, Riga, all of U.S.S.R.

[22] Filed: Oct. 15, 1971

[21] Appl. No.: 189,783

[52] U.S. Cl. .................... 260/293.79, 260/296 R
[51] Int. Cl. .......................................... C07d 29/28
[58] Field of Search ................. 260/293.52, 293.79

[56] References Cited
UNITED STATES PATENTS
2,683,714   7/1954   Kallischnigg ................. 260/293.79
3,037,986   6/1962   Langis ........................... 260/293.52

FOREIGN PATENTS OR APPLICATIONS
553,596   2/1958   Canada ........................... 260/293.52

OTHER PUBLICATIONS
Chemicke Listy, 51: 474–478 (1957) Ferles.
C. A. 51: 10515e (1957) Ferles.

Primary Examiner—Henry R. Jiles
Assistant Examiner—S. D. Winters
Attorney, Agent, or Firm—Eric H. Waters

[57] ABSTRACT

A method for the preparation of N-substituted 4-anilino piperidines having the general formula

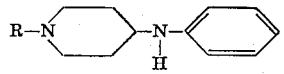

where R is an alkyl group having from 1 to 16 carbon atoms, $C_6H_5CH_2-$, or $C_6H_5(CH_2)_2-$, comprising reacting 4-anilinopyridine with an alkyl or aralkyl halide having the general formula R-X, where R is an alkyl group having from 1 to 16 carbon atoms, $C_6H_5CH_2-$, or $C_6H_5(CH_2)_2-$ and X is Cl, Br or I, with subsequent reduction of the formed N-substituted 4-anilinopyridinium quarternary salt with sodium borohydride in an aqueous-organic solvent and isolation of the main product.

The proposed invention can be used in the synthesis of certain medical preparations, for example analgesic phentanyl and some other physiologically active compounds.

5 Claims, No Drawings

METHOD FOR PREPARATION OF N-SUBSTITUTED 4-ANILINE PIPERIDINES

This invention relates to a method for the preparation of N-substituted 4-anilinopiperidines, and more particularly to the preparation of N-substituted 4-anilinopiperidines having the general formula

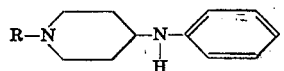

where R is an alkyl group having from 1 to 16 carbon atoms, $C_6H_5CH_2-$, or $C_6H_5(CH_2)_2-$. The said compounds are intermediates in the manufacture of medical preparations like an analgesic phentanyl, known also as N- [1-($\beta$-phenylethyl)-4-piperidyl)] -propionanilide or N-phenyl-N- [4-(1-phenethylpiperidinyl)] -propionanilide, and are also raw materials for synthesizing some other physiologically active substances.

A method is known for the preparation of N-substituted 4-anilinopiperidines having the general formula

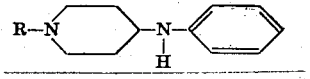

where R is $CH_3$; $C_6H_5CH_2-$; or $C_6H_5(CH_2)_2-$, consisting in heating N-substituted 4-piperidones with aniline in the presence of an acid catalyst, for example p-toluene sulfonic acid, with azeotropic distillation of water with toluene. After distillation of toluene, the isolated product is purified by dissolving in a large quantity of an organic solvent, for example diisopropyl ether, by filtration and distillation of the solvent. The obtained product (Schiff base) is distilled in vacuum.

The purified Shiff base (ketimine) is then dissolved in ether and treated with a suspension of lithium aluminum hydride in ether. After boiling for several hours, the reaction mixture is treated with water and hydrochloric acid. Tartaric acid and alkali are then added and the main product is recovered by an organic solvent with subsequent purification by recrystallization.

The disadvantage of the said method is complexity and laboriousness of the process due to the application of inflammable lithium aluminum hydride in large quantities of ether, and also due to the multiple purification of the intermediate products.

The preparation of the Schiff base and the application of lithium aluminum hydride in the said method requires special apparatus.

The object of this invention is to simplify the process and to rule out the use of the inflammable reducing agent.

This object has been realized in a method for preparation of N-substituted 4-anilinopiperidines having the general formula

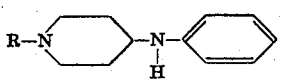

where R is an alkyl group having from 1 to 16 carbon atoms, $C_6H_5CH_2-$ or $C_6H_5(CH_2)_2-$, which comprises reacting 4-anilinopyridine with an organic halide having the formula R-X where R is as defined above and X is Cl, Br or I, with subsequent reduction of the formed N-substituted 4-anilinopyridinium quaternary with sodium borohydride in an aqueous-organic solvent and recovery of the main product.

In order to accelerate the process it is recommended that 4-anilinopyridine react with the alkyl or aralkyl halide in the medium of ethyl alcohol, acetone or dimethyl formamide.

The process should be accelerated preferably by reacting 4-anilinopyridine with the alkyl or aralkyl halide at a temperature of 60°–100°C.

Aqueous solutions of ethyl alcohol, isopropyl alcohol or dimethyl formamide should preferably be used as the aqueous-organic solvent.

The reduction process should preferably be carried out at the ratio of sodium borohydride to the formed N-substituted 4-anilinopyridinium of 2-2.5:1.

The proposed method is effected as follows.

4-Anilinopyridine is reacted with an alkyl or aralkyl halide having the general formula R-X, where R is an alkyl group having from 1 to 16 carbon atoms, $C_6H_5CH_2-$, or $C_6H_5(CH_2)_2-$, and X is Cl, Br or I. The process should preferably be carried out with heating to a temperature of 100°C in an organic solvent or without it. Ethyl alcohol, acetone or dimethyl formamide should preferably be used as the solvent. The obtained N-substituted 4-anilinopyridinium quaternary salts can be isolated from the reaction mixture, or the process can be continued without their recovery.

The recovered quaternary salts can be reprecipitated from methyl alcohol or ethyl alcohol by the action of diethyl ether, or the additional purification of the salts can be omitted.

The yield of the quaternary salts is 90–99 per cent of theory. The obtained N-substituted 4-anilinopyridinium quaternary salts are dissolved in an aqueous-organic solvent, preferably in an aqueous solution of ethyl alcohol, an aqueous solution of isopropyl alcohol or an aqueous solution of dimethyl formamide, and treated with sodium borohydride. The ratio of the organic solvent to water depends completely on the individual properties of each compound and is from 1:5 to 5:1. The reduction process should preferably be carried out at the mole ratio of the sodium borohydride to the quaternary salt of 2:1. In the process without recovery of the quaternary salt from the reaction mixture, the solvent should be introduced in an amount sufficient to dissolve all of the obtained salt.

The introduction of sodium borohydride into the reaction mixture is marked by a change of color from yellow to orange. The reduction process is carried out at a temperature of 10°–30°C. The main product is recovered by evaporating the reaction mixture or by diluting with water, if the product is sparingly soluble in water, with subsequent recrystallization. The yield of the main product is from 80 to 85 per cent by weight of theory.

The proposed method ensures preparation of the main product by a simpler process compared with the prior art methods, since the intermediate products do not require purification and the use of the inflammable reducing agent is ruled out. The proposed method does not require special apparatus and can be reproduced in industrial conditions.

In order to make the invention more understandable to those skilled in the art the following examples of embodiments of the proposed method are given by way of illustration.

EXAMPLE 1

17.1 g (0.1 mole) 4-anilinopyridine and 15.6 g (about 0.11 mole) methyl iodide were boiled in 100 ml absolute ethanol for 5 hours. About 100 ml ethanol were distilled in vacuum, 75 ml dry acetone were added and the reaction mixture was cooled to 0°C. The precipitate was separated and washed with 30 ml dehydrated acetone. 29.7 g (about 95 per cent by weight of theory) yellowish crystals of N-methyl-4-anilinopyridinium iodide were obtained melting point, 175°–177°C (with decomposition).

Determined (in per cent by weight): C 46.04, H 4.57, N 9.12.

Calculated (in per cent by weight): C 46.15, H 4.20, N 8.97.

The 29.7 g (about 0.095 mole) N-methyl-4-anilinopyridinium iodide were placed into a 1000 ml beaker, dissolved in 300 ml of 80 per cent ethyl alcohol with heating on a water bath to a temperature of 50°C, then cooled to a temperature of 15°C and while maintaining the temperature of the solution within the range from 15° to 25°C by cooling with cold water, a solution of 7.6 g (0.2 mole) sodium borohydride in 50 ml water was added over a period of 15 minutes. The mixture was kept for two hours at a temperature of 15°–20°C, then filtered and evaporated in vacuum to about 50 ml. Potassium carbonate was added to saturation, and the product was extracted three times with 100 ml portions of benzene. The benzene was distilled and the residue crystallized from an aqueous solution of ethyl alcohol. The yield was 17 g (about 95 per cent by weight of theory) colorless crystals of N-methyl-4-anilinopiperidine having a melting point of 81°–82°C.

Found (in per cent by weight): C 75.61, H 9.24, N 14.53, $C_{12}H_{18}N_2$.

Calculated (in per cent by weight): C 75.78, H 9.55, N 14.74.

EXAMPLE 2

17.1 g (0.1 mole) 4-anilinopyridine were dissolved in 50 ml dimethyl formamide, 15.6 g (about 0.11 mole) methyl iodide were added and the mixture was allowed to stand at room temperature for 30 hours. Then the solvent was distilled in vacuum, the residue dissolved in 300 ml ethyl alcohol and the process was further continued as described in Example 1. 17 g (about 90 per cent by weight of theory) of N-methyl-4-anilinopiperidine having a melting point of 81°–82°C were obtained.

EXAMPLE 3

1.7 g (0.01 mole) 4-anilinopyridine and 3.25 g (0.01 mole) hexadecyl iodide were mixed in a test tube fitted with a ground-in stopper and heated at a temperature of 150°C until the components fused into a homogeneous mass and kept at a temperature of 90°–100°C for 20 hours. In 6 hours the melt began to set into a crystalline mass. The obtained mass was triturated with an anhydrous mixture of acetone and ether. 4.7g (90 per cent by weight of theory) of yellowish crystals of N-hexadecyl-4-anilinopyridinium iodide were obtained. The melting point, 97°–98°C (with decomposition).

Determined (in per cent by weight): C 63.79, H 8.14, N 5.60, $C_{27}H_{43}N_2I$.

Calculated (in per cent by weight): C 62.04, H 8.21, N 5.34.

4.7 g (0.009 mole) N-hexadecyl-4-anilinopyridinium iodide were dissolved in 50 ml isopropyl alcohol, and 0.76 g (0.02 mole) sodium borohydride solution in 10 ml water was added with stirring. The mixture was allowed to stand for three hours at room temperature, then the solvent was distilled in vacuum, 50 ml water were added, the product was separated, and crystallized from methyl alcohol. The yield was 3g (83 per cent by weight of theory) N-heradecyl-4-anilino piperidine having a melting point of 44.45°C.

Found (in per cent by weight): C 64.47, H 12.39, N 7.4 $C_{27}H_{48}N_2$.

Calculated (in per cent by weight): C 64.27, H 12.10, N 6.99.

EXAMPLE 4

Into a 1-liter flask were charged 85.5 g (0.5 mole) 4-anilinopyridine and 94 g (0.505 mole) β-phenylethyl bromide. Then 500 ml acetone were added and the mixture was refluxed for 12 hours. The precipitate of 4-anilinopyridine was dissolved gradually and crystals of N-(β-phenylethyl-4-anilinopyridinium bromide begin to fall out. The mixture was cooled to room temperature, the yellow crystals were separated, washed with 100 ml acetone and air dried. The yield of N-(β-phenylethyl)-4-anilinopyridinium bromide was 160 g (91 per cent by weight of theory). The melting point was 188°–190°C (with decomposition).

Determined (in per cent by weight) C 65.41, H 3.84, N 7.86, $C_{19}H_{14}N_2Br$. Calculated (in per cent by weight): C 65.18, H 4.02, N 8.00.

The formed N-(β-phenylethyl)-4-anilinopyridinium bromide was reduced by the method described in Example 3 to obtain 102 g (about 80 per cent by weight of theory) of colorless crystals (from acetone) of N-(β-phenylethyl)-4-anilinopiperidine having a melting point of 90°–91°C.

Found (in per cent by weight): C 81.30, H 8.71, N 10.11 $C_{19}H_{24}N_2$.

Calculated (in per cent by weight): C 81.37, H 8.63, N 9.99.

EXAMPLE 5

8.55 g (0.05 mole) 4-anilinopyridine and 6.35 g (0.05 mole) benzyl chloride were heated in 50 ml dimethyl formamide for 6 hours at a temperature of 90°–100°C, then cooled to room temperature and a solution of 4.2 g (about 0.11 mole) sodium borohydride in 20 ml water was added. The mixture was allowed to stand for three hours and then evaporated under vacuum to about 25 ml. 100 ml water were added, the product was separated and crystallized from hexane. The yield of colorless crystals of N-benzyl-4- was 10.6g (80 per cent by weight of theory). The melting point of the product was 85°–86°C.

Found (in per cent by weight): C 81.44, H 8.19, N 10.26, $C_{18}H_{22}N_2$.

Calculated (in per cent by weight): C 81.10, H 8.32, N 10.52.

EXAMPLE 6

1.72 g (0.01 mole) 4-anilinopyridine, 2.07 g (0.01 mole) nonyl bromide and 10 ml dimethyl formamide were heated on a steam bath for 24 hours, then cooled to room temperature and a solution of 0.8 g (about 0.02 mole) sodium borohydride in 2 ml water was added. The mixture was allowed to stand for three hours and then poured into a vessel containing 200 ml water. The semi-liquid product was separated, dissolved in 50 ml of 5 per cent hydrochloric acid, treated with 0.1 g activated carbon and passed through a filter. The filtrate was alkalized with 30 per cent solution of sodium hydroxide to pH 10 and the product was separated. Crystallization was effected from hexane by cooling the solution to a temperature of 70°C. The yield of colorless crystals of N-nonyl-4-anilinopiperidine was 1.5 g (about 50 per cent of theory). The melting point of the product was 72°–74°C.

Found (in per cent by weight): C 79.43, H 11.33, N 9.26, $C_{20}H_{34}N_2$.

Calculated (per cent by weight): C 79.50, H 11.18, N 9.32.

What is claimed is:

1. A method for the preparation of an N-substituted 4-anilinopiperidine having the formula

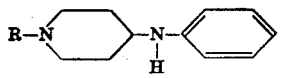

where R is selected from the group consisting of alkyl groups having from 1 to 16 carbon atoms, $C_6H_5CH_2-$, and $C_6H_5(CH_2)_2-$, which comprises reacting 4-anilinopyridine with a halide having the formula R-X, where R is as defined above and X is selected from the group consisting of Cl, Br and I, to form a quaternary salt of N-substituted 4-anilinopyridine, reducing the quaternary salt with sodium borohydride and isolating the product in an aqueous-organic solvent.

2. A method according to claim 1, wherein 4-anilinopyridine is reacted with the halide in an organic solvent selected from the group consisting of ethyl alcohol, acetone and dimethyl formamide.

3. A method according to claim 1, wherein 4-anilinopyridine is reacted with the halide at a temperature of 60°–100°C.

4. A method according to claim 1, wherein the aqueous-organic solvent is selected from the group consisting of aqueous solutions of ethyl alcohol, isopropyl alcohol and dimethyl formamide.

5. A method according to claim 1, wherein the reduction process is carried out at a mole ratio of sodium borohydride to the formed quaternary salt of N-substituted 4-anilinopyridine of 2-2.5:1.

* * * * *